(12) United States Patent
Heckbert

(10) Patent No.: US 9,007,389 B1
(45) Date of Patent: Apr. 14, 2015

(54) TEXTURE MAP COMPONENT OPTIMIZATION

(75) Inventor: Paul S. Heckbert, Pittsburgh, PA (US)

(73) Assignee: NVIDIA Corporation, Santa Clara, CA (US)

( * ) Notice: Subject to any disclaimer, the term of this patent is extended or adjusted under 35 U.S.C. 154(b) by 1205 days.

(21) Appl. No.: 11/766,731

(22) Filed: Jun. 21, 2007

Related U.S. Application Data

(60) Provisional application No. 60/823,483, filed on Aug. 24, 2006.

(51) Int. Cl.
*G09G 5/00* (2006.01)
*G09G 5/393* (2006.01)

(52) U.S. Cl.
CPC ...................................... *G09G 5/393* (2013.01)

(58) Field of Classification Search
CPC ......... G06T 11/001; G06T 3/40; G06T 15/04; G09G 5/391
See application file for complete search history.

(56) References Cited

U.S. PATENT DOCUMENTS

| | | | |
|---|---|---|---|
| 6,005,582 A | 12/1999 | Gabriel et al. | |
| 6,084,601 A * | 7/2000 | Thayer | 345/564 |
| 6,490,652 B1 | 12/2002 | Van Hook et al. | |
| 6,919,904 B1 | 7/2005 | Kilgariff | |
| 7,545,984 B1 | 6/2009 | Kiel et al. | |
| 2003/0138152 A1 | 7/2003 | Fenney | |
| 2003/0201994 A1 | 10/2003 | Taylor et al. | |
| 2006/0164429 A1 * | 7/2006 | Mantor et al. | 345/582 |
| 2006/0269152 A1 | 11/2006 | Fenney | |

OTHER PUBLICATIONS

Office Action, U.S. Appl. No. 11/766,736, dated Nov. 25, 2009.

* cited by examiner

*Primary Examiner* — Antonio A Caschera
(74) *Attorney, Agent, or Firm* — Artegis Law Group, LLP

(57) ABSTRACT

Embodiments of the present invention are directed towards increasing texture filtering performance for texel components represented by more than 8 bits. As the number of bits per component increases, the number of texels that are processed each clock cycle decreases since more bits need to be processed to produce each filtered result. A filtered result may be accumulated over two or more iterations, with each iteration producing a portion of the filtered result. When only a portion of the components for each texel are used, the unused texel components are not processed. Elimination of unnecessary texel processing for unused texel components may improve texture filtering performance.

18 Claims, 14 Drawing Sheets

US 9,007,389 B1

TEXTURE MAP COMPONENT OPTIMIZATION

CROSS-REFERENCE TO RELATED APPLICATIONS

This application claims benefit of U.S. provisional patent application Ser. No. 60/823,483, filed Aug. 24, 2006, which is herein incorporated by reference.

BACKGROUND OF THE INVENTION

1. Field of the Invention

One or more aspects of the invention generally relate to computer graphics, and more particularly to processing texture map data.

2. Description of the Related Art

Conventional graphics processors are exemplified by systems and methods developed to read and filter texture map texels. In particular, conventional texels are represented by 8 bits per component. As the number of bits used to represent each texel component increases to produce a higher quality image, more bits of the texels are processed to produce each filtered result. Similarly when anisotropic filtering is used to produce a higher quality image, more texels are processed to produce each filtered result. Therefore, texture filtering performance may decrease as the anisotropic ratio increases or as the number of bits per texel component increases.

Accordingly, there is a need to improve texel filtering performance when anisotropic filtering is used or when texels are represented by more than 8 bits per component.

SUMMARY OF THE INVENTION

The current invention involves new systems and methods for increasing texture filtering performance for high bit-count texel components, i.e., texel components that are represented by more than 8 bits. As the number of bits per component increases, the number of texels that are processed each clock cycle decreases since more bits need to be processed to produce each filtered result. A filtered result may be accumulated over two or more passes, with each pass producing a portion of the filtered result. When only a portion of the components for each texel are used, the unused texel components are not processed. Elimination of unnecessary texel processing for unused texel components may improve texture filtering performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
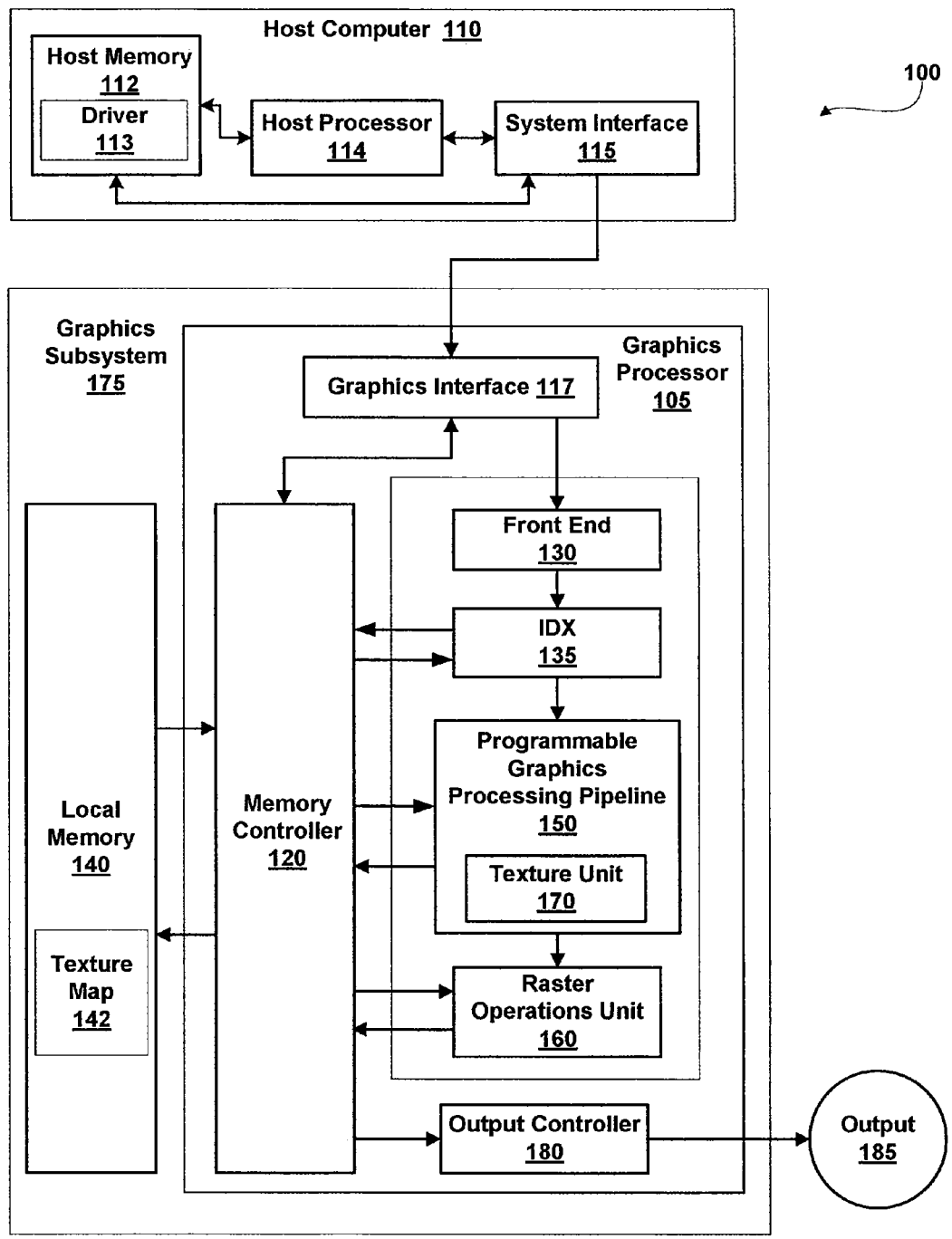
FIG. 1 is a block diagram of an exemplary embodiment of a respective computer system in accordance with one or more aspects of the present invention including a host computer and a graphics subsystem.

FIG. 1 illustrates a computing system generally designated 100 including a host computer 110 and a graphics subsystem 175, including texture unit 175, in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. Examples of system interface 115 known in the art include Intel® Northbridge.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, driver 113 may provide texture unit 170 with a base address of texture map 142 stored in local memory 140. The base address of texture map 142 is used by texture unit 170 to read texels from texture map 142.

Host computer 110 communicates with graphics subsystem 175 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor, including texture maps. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. Programmable graphics processing pipeline 150 and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, anisotropic texture filtering, interpolation, and the like. Programmable graphics processing pipeline 150 and raster operations unit 160 are each optionally configured such that data processing operations are performed in multiple passes through those units or in multiple passes within programmable graphics processing pipeline 150. Programmable graphics processing pipeline 150 and raster operations unit 160 also each include a write interface to memory controller 120 through which data can be written to memory.

In a typical implementation, programmable graphics processing pipeline 150 performs geometry computations, rasterization, and pixel computations. Therefore, programmable graphics processing pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in local memory 140. When the data received by graphics subsystem 175 has been completely processed by graphics processor 105, an output 185 of graphics subsystem 175 is provided using an output controller 180. Output controller 180 is optionally configured to deliver data to a display device, network, electronic control system, other computing system 100, other graphics subsystem 175, or the like. Alternatively, data is output to a film recording device or written to a peripheral device, e.g., disk drive, tape, compact disk, or the like.

At least one set of samples is output by IDX 135 and received by programmable graphics processing pipeline 150. A set of samples is processed according to at least one program, e.g., geometry, vertex, or shader program. A program can process one or more sets of samples. Conversely, a set of samples can be processed by a sequence of one or more programs.

Samples, such as surfaces, primitives, or the like, are received from IDX 135 by programmable graphics processing pipeline 150 and processed in a multithreaded processing unit. Programmable graphics processing pipeline 150 may include several multithreaded processing units. A multithreaded processing unit may receive first samples, such as higher-order surface data, and tessellate the first samples to generate second samples, such as vertices. A multithreaded processing unit may be configured to transform the second samples from an object-based coordinate representation (object space) to an alternatively based coordinate system such as world space or normalized device coordinates (NDC) space. Each multithreaded processing unit may communicate with texture unit 170 using a read interface to read program instructions and graphics data such as texture maps from local memory 140 or host memory 112 via memory controller 120. Texture unit 170 may include a cache to improve memory read performance by reducing read latency. Alternatively, each multithreaded processing unit has a dedicated instruction read interface to read program instructions from local memory 140 or host memory 112 via memory controller 120. In other embodiments of the present invention, each multithreaded processing unit may include a texture unit 170.

Graphics primitives may be assembled from vertices and then rasterized to produce fragments for pixels and coverage data. Program instructions configure multithreaded processing units to perform operations such as tessellation, perspective correction, texture mapping, shading, blending, and the like, to produce processed samples. The processed samples are output from programmable graphics processing pipeline to raster operations unit 160.

In some embodiments of computing system 100 graphics processing performance is limited by memory bandwidth, e.g. between host memory 112 and programmable graphics processor 105, between local memory 140 and graphics processing pipeline 103, and the like. In those embodiments using a texel cache to reduce the number of texels read from local memory 140 or host memory 112 may improve graphics processing performance. Performance may be further improved by only processing texels for covered pixels and texel components that are used, to produce a filtered result for a pixel. A texel component is used when a shader program specifies that the component as an output of a texture mapping operation. Specifying a component as an input to a texture mapping operation, but not as an output means that the component is not used for the purposes of producing a filtered result for a pixel. Cache performance may be improved by ensuring texel read locality based on the alignment of the major axis of anisotropy in screen space when processing a sequence of texels.

Figure 2:
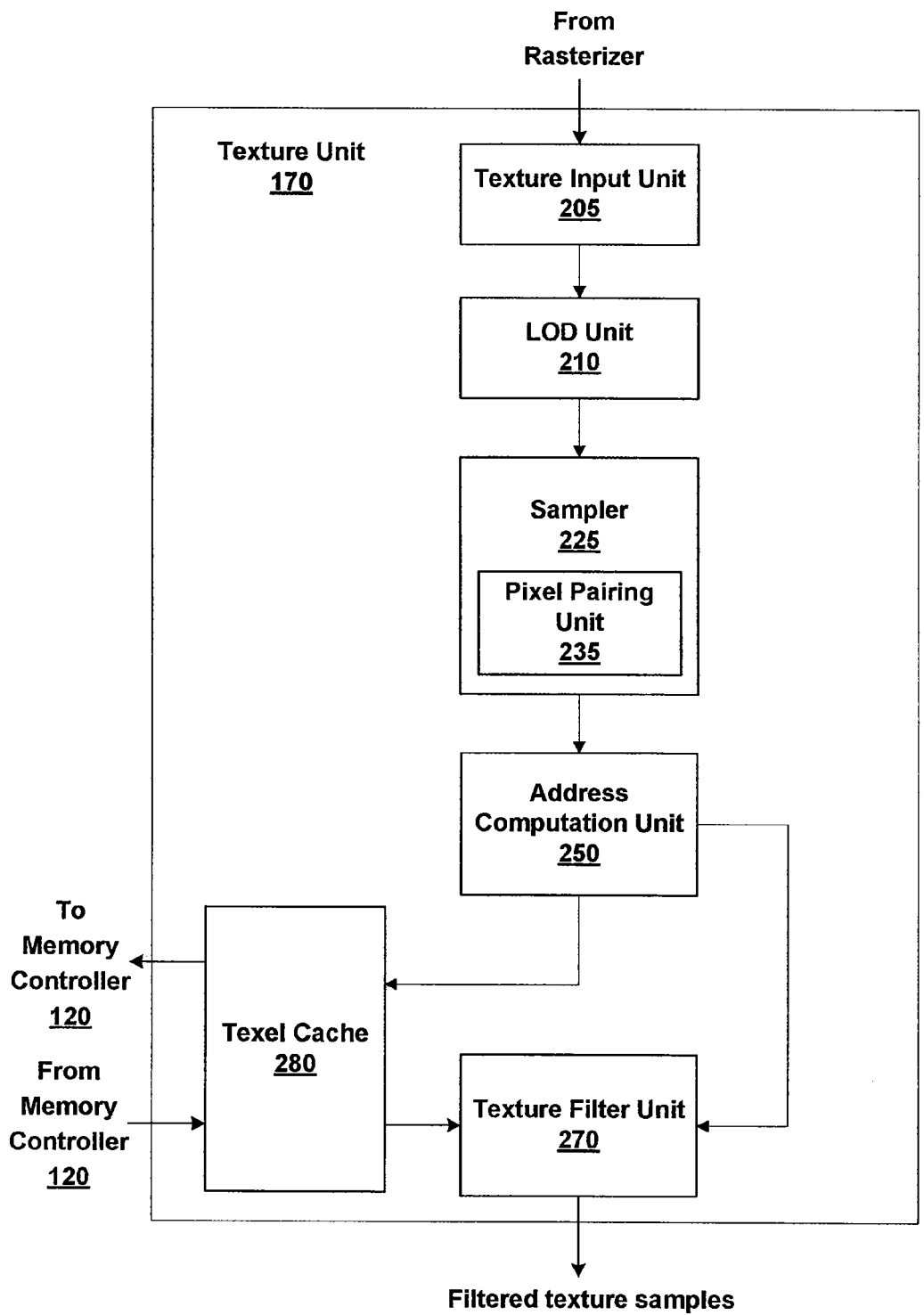
FIG. 2 is a block diagram of the texture unit of FIG. 1 in accordance with one or more aspects of the present invention.

FIG. 2 is a block diagram of texture unit 170 of FIG. 1, in accordance with one or more aspects of the present invention. Texture unit 170 receives texture requests for fragments produced during rasterization. A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. Coverage information is also produced during rasterization of the primitive and the coverage information is provided to texture unit 170. The coverage information may indicate which of one or more sub-pixel sample positions for a pixel are included within a fragment and may be used to perform coverage based optimizations, as described in conjunction with FIGS. 4A and 4B.

Texture unit 170 includes a texture input unit 205 that receives texture state information, e.g., texture IDs, filter parameters, and the like. Texture input unit 205 also receives texture requests including texture coordinates, e.g., u, v, and s, t, and the like, as packets from multithreaded processing units. The texture state information is stored and provided to other units within texture unit 170. For example, the texture ID may be provided to an address computation unit 250 to determine the base address of the current texture map. The texture requests correspond to a 2×2 pixel quad that is included in a packet. Texture input unit 205 outputs the texture coordinates for the pixel quad in a packet to an LOD (level of detail) unit 210. As the packet flows through the different units in texture unit 170 the information in the packet is updated by each unit, changing from texture requests including texture coordinates for a pixel quad, to filtered samples for the pixel quad.

Figure 5A:
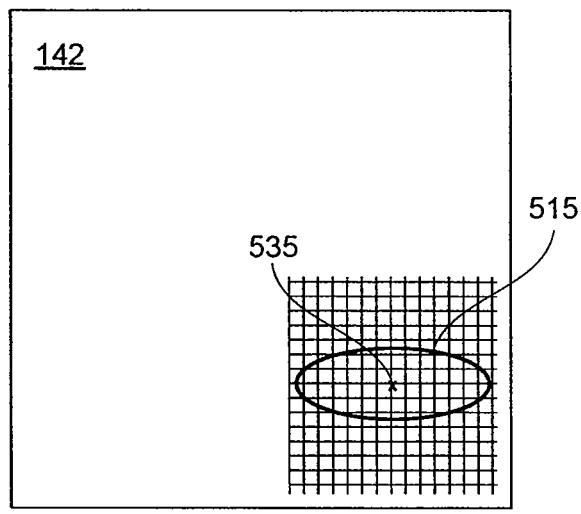
FIGS. 5A, 5B, and 5C are conceptual diagrams showing an anisotropic pixel footprint.
Figure 7A:
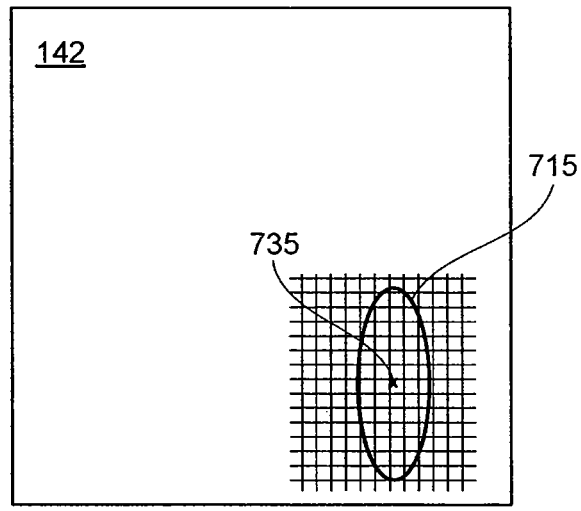
FIGS. 7A, 7B, and 7C are other conceptual diagrams showing an anisotropic pixel footprint.

The LOD unit 210 computes derivative values, e.g., du/dx, du/dy, dv/dx, and dv/dy, for the pixel quad. The pixel footprint size in texture space, level of anisotropy (anisotropic ratio), texture map level of detail, and major axis alignment is determined. In conventional graphics processors a ratio value representing the ratio of the length of the minor axis to the length of the major axis, e.g. minor axis/major axis, is computed using a technique known to those skilled in the art. The ratio value, i.e., anisotropic ratio, is used to determine a number of texture samples to filter during anisotropic filtering to produce the filtered result. Each texture sample is produced by filtering one or more texels. The major axis and minor axis define a footprint that represents the projection of the pixel onto the texture map, as shown in FIGS. 5A and 7A. The major axis alignment indicates whether the major axis of anisotropy in texture space is more closely aligned with the x axis or with the y axis in screen space. The major axis alignment may be used to perform pixel pairing optimizations to improve texture cache hit rates, as described in conjunction with FIGS. 8A and 8B. LOD unit 210 outputs the LOD level, the anisotropic ratio, and the major axis alignment to a sampler 225.

Sampler 225 determines a number of texture samples to filter based the anisotropic ratio. Specifically, sampler 225 determines the number of and locations, e.g., texture coordinates, of the number of texture samples needed to approximate the filter as a linear combination of bilinear interpolations. When trilinear filtering is specified, texels are read and processed from two LODs of texture map 142 to produce two linear combinations of bilinear interpolations that are combined to produce the filtered result for each pixel. Sampler 225 serializes the filtering workload into one or more packets that are output to an address computation unit 250.

In some embodiments of the present invention, the packets are ordered by a pixel pairing unit 235 to improve a hit rate of a texel cache 280. Pixel pairing unit 235 pairs texel reads for texture samples within pixels aligned along the x axis when major axis alignment is along the y axis and pairing texel reads for texture samples within pixels aligned with the y axis when major axis alignment is along the x axis, as described in conjunction with FIGS. 8A and 8B. Pixel pairing unit 235 may also order the packets to traverse the anisotropic footprint in a particular fashion, e.g., starting in the middle and working outward or starting at one end and working toward the other end, as described in conjunction with FIGS. 6B, 6C, 6D, and 7D.

As previously described, sampler 225 receives texel coordinates for a pixel quad in a packet. Depending on the texel format (number of bits per texel), number of texel components, filtering mode (bilinear or trilinear), and anisotropic ratio, one or more packets are output by sampler 225 to produce filtered results for the pixel quad. In some embodiments of the present invention, eight bilinear interpolations of 32 bit texels are included in a packet, where a 32 bit texel may include four 8 bit components, two 16 bit components, or one 32 bit component. Therefore, 2:1 anisotropic filtering of a pixel quad may be performed using a single packet for a processing throughput of one pixel quad per clock. In other embodiments of the present invention, fewer or more bilinear interpolations, or different bits per texel, are included in a packet. TABLE 1 shows the number of packets that are output for various 32 bit texel modes. Columns of TABLE 1 include an LOD level, number of bilinear interpolations (bilerps) per pixel, and number of pixels per packet for 32 bit texels. Notice that for anisotropic ratios of 4:1 and greater, each packet includes texels for half of the pixels in a pixel quad. In the case of 6:1 anisotropy the first two packets (packet 0 and 1) include texels for one half of the pixels and the second two packets (packet 2 and 3) includes texels for the other half of the pixels.

TABLE 1

Serialization of 32 bit texels

| | | | |
|---|---|---|---|
| 32 bit texels with bilinear 1:1 anisotropy | | | |
| Packet 0 | LOD 0 | 1 bilerp/pixel | 4 pixels |
| 32 bit texels with trilinear 1:1 anisotropy | | | |
| Packet 0 | LOD 0 & 1 | 2 bilerp/pixel | 4 pixels |
| 32 bit texels with bilinear 2:1 anisotropy | | | |
| Packet 0 | LOD 0 | 2 bilerp/pixel | 4 pixels |
| 32 bit texels with trilinear 2:1 anisotropy | | | |
| Packet 0 | LOD 0 | 2 bilerp/pixel | 4 pixels |
| Packet 1 | LOD 1 | 2 bilerp/pixel | 4 pixels |
| 32 bit texels with bilinear 4:1 anisotropy | | | |
| Packet 0 | LOD 0 | 4 bilerp/pixel | 2 pixels |
| Packet 1 | LOD 0 | 4 bilerp/pixel | 2 pixels |
| 32 bit texels with bilinear 6:1 anisotropy | | | |
| Packet 0 | LOD 0 | 4 bilerp/pixel | 2 pixels |
| Packet 1 | LOD 0 | 2 bilerp/pixel | 2 pixels |
| Packet 2 | LOD 0 | 4 bilerp/pixel | 2 pixels |
| Packet 3 | LOD 0 | 2 bilerp/pixel | 2 pixels |

In some embodiments of the present invention, four bilinear interpolations of 64 bit texels are included in a packet, where a 64 bit texel may include four 16 bit components or two 32 bit components. Therefore, 1:1 anisotropic filtering of a pixel quad may be performed using a single packet for a processing throughput of one pixel quad per clock. TABLE 2 shows the number of packets that are output for various 64 bit texel modes. Columns of TABLE 2 include an LOD level, number of bilinear interpolations (bilerps) per pixel, and number of pixels per packet for 64 bit texels. Notice that for anisotropic ratios of 2:1 and greater, each packet includes texels for half of the pixels in a pixel quad.

TABLE 2

| | Serialization of 64 bit texels | | |
|---|---|---|---|
| | 64 bit texels with bilinear 1:1 anisotropy | | |
| Packet 0 | LOD 0 | 1 bilerp/pixel | 4 pixels |
| | 64 bit texels with trilinear 1:1 anisotropy | | |
| Packet 0 | LOD 0 | 1 bilerp/pixel | 4 pixels |
| Packet 1 | LOD 1 | 1 bilerp/pixel | 4 pixels |
| | 64 bit texels with bilinear 2:1 anisotropy | | |
| Packet 0 | LOD 0 | 2 bilerp/pixel | 2 pixels |
| Packet 1 | LOD 0 | 2 bilerp/pixel | 2 pixels |
| | 64 bit texels with bilinear 4:1 anisotropy | | |
| Packet 0 | LOD 0 | 4 bilerp/pixel | 2 pixels |
| Packet 1 | LOD 0 | 4 bilerp/pixel | 2 pixels |
| Packet 2 | LOD 0 | 4 bilerp/pixel | 2 pixels |
| Packet 3 | LOD 0 | 4 bilerp/pixel | 2 pixels |

In some embodiments of the present invention, four bilinear interpolations of 128 bit texels are included in a packet, where a 128 bit texel includes four 32 bit components. Therefore, 1:1 anisotropic filtering of a pixel quad may be performed using two packets for a processing throughput of half a pixel quad per clock. TABLE 3 shows the number of packets that are output for various 128 bit texel modes. Columns of TABLE 3 include a number of bilinear interpolations (bilerps) per pixel, a number of components per texel, and number of pixels per packet for 128 bit texels. Notice that each packet includes texels for half of the components in a pixel quad for 1:1 anisotropy and half of the components for half of the pixels in a pixel quad for anisotropic ratios of 2:1 and greater.

TABLE 3

| | Serialization of 128 bit texels | | |
|---|---|---|---|
| | 128 bit texels with bilinear 1:1 anisotropy | | |
| Packet 0 | 1 bilerp/pixel | 2 components | 4 pixels |
| Packet 1 | 1 bilerp/pixel | 2 components | 4 pixels |
| | 128 bit texels with bilinear 4:1 anisotropy | | |
| Packet 0 | 1 bilerp/pixel | 2 components | 2 pixels |
| Packet 1 | 1 bilerp/pixel | 2 components | 2 pixels |
| Packet 2 | 1 bilerp/pixel | 2 components | 2 pixels |
| Packet 3 | 1 bilerp/pixel | 2 components | 2 pixels |
| Packet 4 | 1 bilerp/pixel | 2 components | 2 pixels |
| Packet 5 | 1 bilerp/pixel | 2 components | 2 pixels |
| Packet 6 | 1 bilerp/pixel | 2 components | 2 pixels |
| Packet 7 | 1 bilerp/pixel | 2 components | 2 pixels |

Sampler 225 also computes weights, using techniques known to those skilled in the art, for use by a texture filter unit 270 during filtering of the texture samples to produce a filtered result. Sampler 225 outputs packets including the weights and sample locations, represented as texel coordinates, to address computation unit 250. Address computation unit 250 uses texture parameters (texture ID, and the like) received by texture input unit 205 to determine addresses for reading texels for texture samples from memory via texel cache 280. Address computation unit 250 outputs the addresses and a read request to texel cache 280. When a texel is not available in texel cache 280, i.e., there is a cache miss, texel cache 480 replaces a cache line with data read from memory that includes the texel. Address computation unit 250 passes the weights to texture filter unit 270 for use in producing the filtered results.

In some embodiments of the present invention, texel cache 280 is configured to read up to four cache lines in a clock cycle. Therefore, when texel reads are ordered based on the major axis alignment and locality is increased, the texels needed to perform anisotropic filtering may be read in fewer clock cycles, thereby improving performance.

Texels read from texel cache 280 are placed in a packet and output to texture filter unit 270. Texture filter unit 270 optionally performs isotropic filtering to compute each texture sample using the texels read for each texture sample. Texture Filter Unit 470 receives the weights from Address Computation Unit 450 and filters the texture samples using the weights (and linear interpolation for trilinear filtering) to produce filtered results.

Several bilinearly interpolated samples may be combined to produce an anisotropically filtered result for a pixel. When sampler 225 serialized a received packet for a pixel quad and produced multiple packets, texture filter unit 270 processes the multiple packets to produce filtered results for the pixel quad. In some embodiments of the present invention, texture filter unit 270 is configured to compute eight bilinearly interpolated samples of 32 bit texel in parallel, four bilinearly interpolated samples of 64 bit texels in parallel, or two bilinearly interpolated samples of 128 bit texels. Therefore, when 128 bit texels are used, the filtered result for an isotropically filtered pixel quad or half of an anisotropically filtered pixel quad is produced in two passes through texture unit 170, as described in conjunction with FIG. 3A. The filtered results for a pixel quad are output by texture unit 170 to a multithreaded processing unit within programmable graphics processing pipeline 150. The multithreaded processing unit may use the filtered results to compute a color for each fragment as specified by a shader program.

Figure 3A:
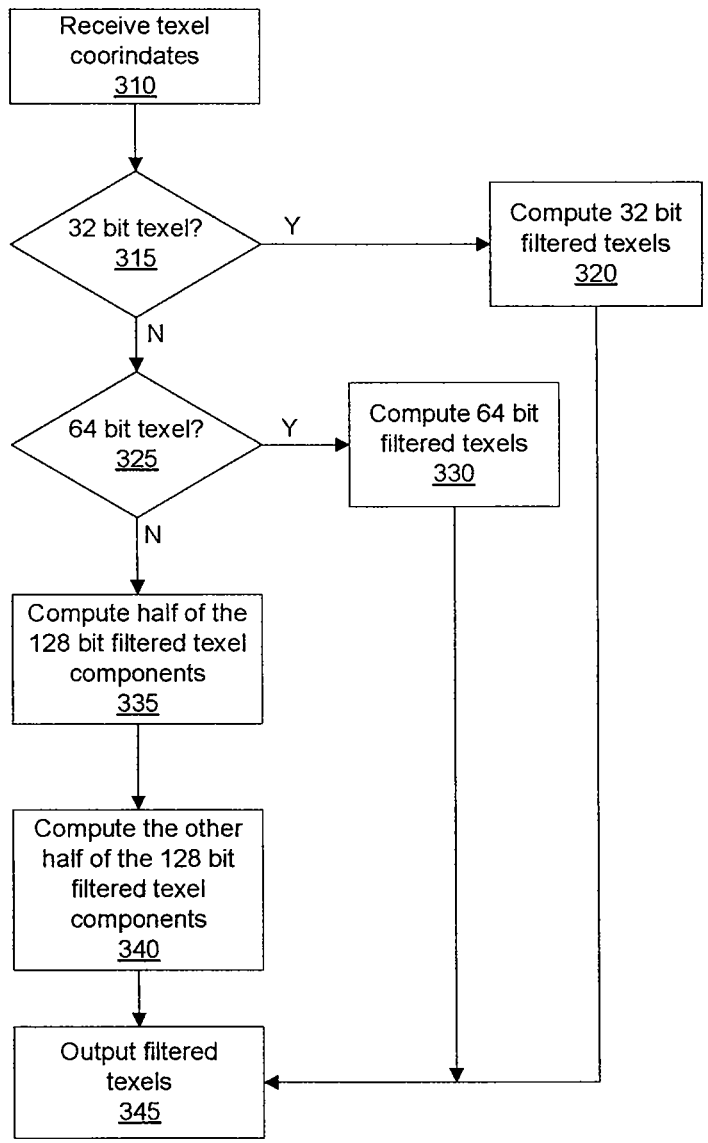
FIG. 3A illustrates an embodiment of a method of processing high bit-count texels in accordance with one or more aspects of the present invention.

FIG. 3A illustrates an embodiment of a method of processing high bit-count texels, in accordance with one or more aspects of the present invention. All of the high bit-count texels for a pixel quad may not fit within a single packet. For example, texture filter unit 270 may be configured to process a packet each clock cycle and only two 128 bit texels fit within a packet. Therefore, multiple packets are needed to process a pixel quad when 128 bit texels are used. A single packet may be used for 32 and 64 bit texels for an entire pixel quad when texture filter unit 270 is configured to process eight bilinearly filtered 32 bit texels per clock cycle or four bilinearly filtered 64 bit texels.

In step 310 sampler 225 receives a packet including texels for a pixel quad. A single set of texture coordinates may be used for an entire pixel quad since texture coordinates for each individual pixel in the 2×2 pixel quad may be derived from that set of texture coordinates. In step 315 sampler 225 determines if the texel format is 32 bits per texel, and, if so, in step 320 sampler 225 outputs one or more packets including texel coordinates for texture samples. Each texture sample may correspond to four 32 bit texels that are bilinearly interpolated. In step 320 the one or more packets including the 32 bit texels (the texels read from texel cache 280 replace the coordinates) are filtered by texture filter unit 270 to produce filtered results for the pixel quad. A single packet may be output by sampler 225 to provide texel coordinates for eight bilinear interpolations (32 four component texels) that are used to produce a 2:1 anisotropically filtered result for each pixel in the pixel quad. When an anisotropic ratio greater than 2:1 is used, additional packets are output by sampler 225 and processed by texture filter unit 270 to accumulate the filtered results for the pixel quad. Each packet includes texel coordinates for each of the four pixels in the pixel quad.

If, in step 315 sampler 225 determines that the texel format is not 32 bits per texel, then in step 325 sampler 225 determines if the texel format is 64 bits per texel. If, in step 325 sampler 225 determines that the texel format is 64 bits per texel, then in step 330 sampler 225 outputs one or more packets including 64 bit texel coordinates. In step 330 the one or more packets including 64 bit texels (read from texel cache 280) are filtered by texture filter unit 270 to produce filtered results for the pixel quad. A single packet may be output by sampler 225 to provide texel coordinates for four bilinear interpolations (16 four component texels) that are used to produce an isotropically (1:1 anisotropically) filtered result for each pixel in the pixel quad. When an anisotropic ratio greater than 1:1 is used, additional packets are output by sampler 225 and processed by texture filter unit 270 to accumulate the filtered results for the pixel quad. Each packet includes texel coordinates for each of the four pixels in the pixel quad.

If, in step 325 sampler 225 determines that the texel format is not 64 bits per texel, then the texel format is 128 bits per texel, and in step 335 sampler 225 outputs one or more packets including texels coordinates for the 128 bit texels of the pixel quad. However, rather than reading texels for all of the components of the pixel quad, only half of the components are read and processed in a first pass. For example, if each texel includes red, green, blue, and alpha components, then only two of the four components are read and processed in a first pass through texture unit 170.

In step 335 a first set of packets including 128 bit texels are filtered by texture filter unit 270 to produce filtered results for half of the pixel quad components. A single packet may be output in the first set of packets to provide texel coordinates for two bilinear interpolations (8 four component texels) that are used to produce an isotropically filtered result for half of the pixel quad components. When an anisotropic ratio greater than 1:1 is used, additional packets are included in the first set of packets and processed by texture filter unit 270 to accumulate the filtered results for half of the pixel quad components. Each packet includes texel coordinates for half of the components in each of the four pixels in the pixel quad.

In order to produce the filtered results for the other half of the pixel components in the pixel quad, in step 340 sampler 225 outputs a second set of packets including the same texel coordinates for the 128 bit texels that were output in step 335. In step 335 the second set of packets including 128 bit texels (read from texel cache 280) are filtered by texture filter unit 270 to produce filtered results for the other half of the pixel quad components. In step 345 the filtered results for the pixel quad are output by texture filter unit 270.

Figure 3B:
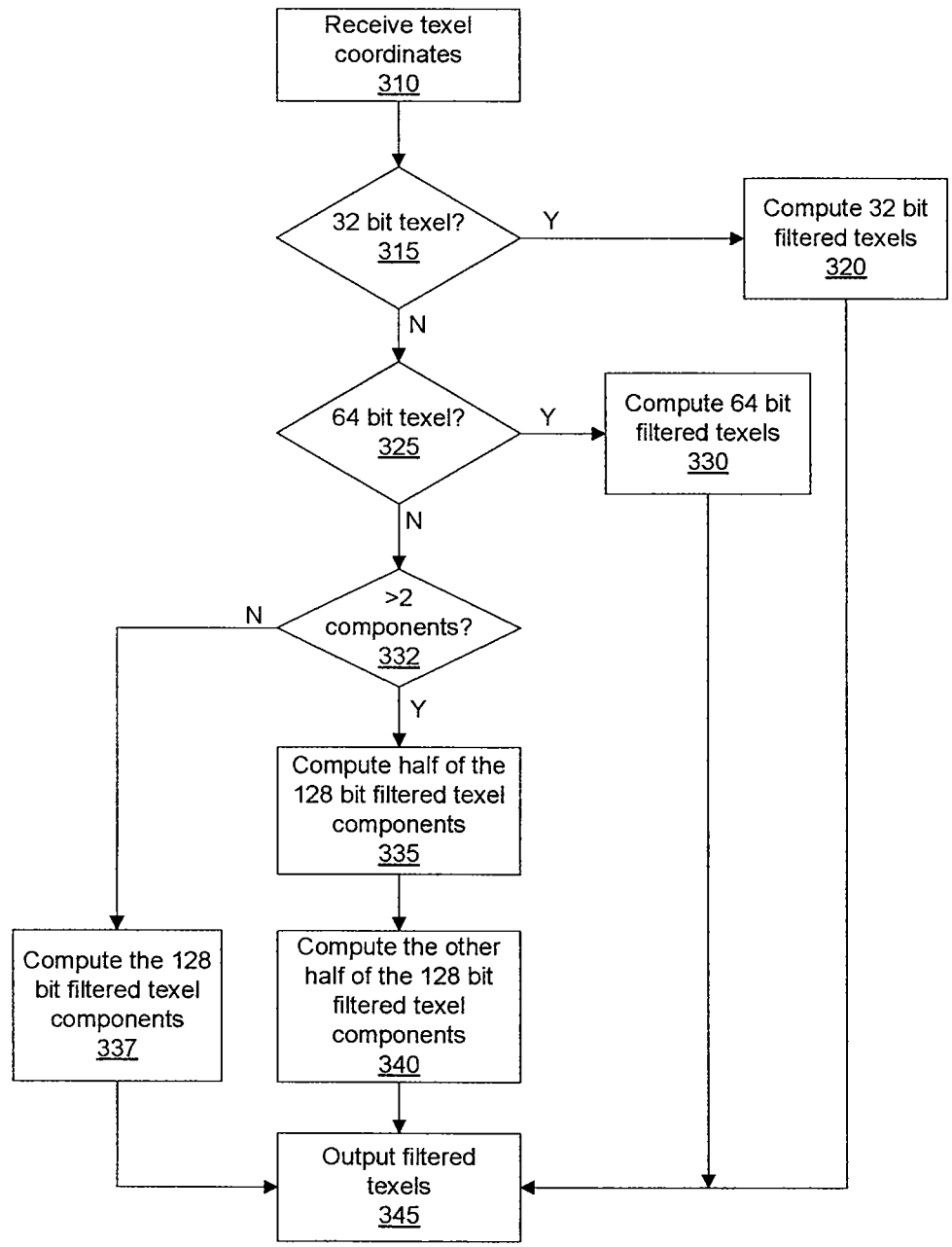
FIG. 3B illustrates an embodiment of a method of processing high bit-count texels with component optimization in accordance with one or more aspects of the present invention.

FIG. 3B illustrates an embodiment of a method of processing high bit-count texels with component optimization, in accordance with one or more aspects of the present invention. Steps 310, 315, 320, 325, and 330 are completed as previously described. In step 332 sampler 225 determines if more than two of the texel components are used, and, if so, sampler 225 proceeds to step 335. A texel component is used when a shader program specifies that the component as an output of a texture mapping operation. Specifying a component as an input to a texture mapping operation, but not as an output means that the component is not used for the purposes of producing a filtered result for a pixel.

If, in step 332 sampler 335 determines that two or fewer texel components are used, then in step 337 sampler 225 outputs one or more packets including texel coordinates for 128 bit texels of the pixel quad and the texel components are filtered by texture filter unit 270 to produce filtered results for the pixel quad components that are used. Sampler 225 indicates the texel components that should be read from texel cache 280 since the component may differ from the components that are read in either the first or the second pass. Texture filtering throughput may be improved for high bit-count texels by performing component optimization, i.e., eliminating the second pass through texture unit 170 to produce the unused components.

Another optimization, a coverage optimization based on pixel coverage may be used to improve texture filtering throughput when the anisotropic ratio is high, i.e., greater than 4:1. When at least half of the pixels in a pixel quad are not covered, texel coordinates for the uncovered pixels are not output by sampler 225. Therefore, the texels for the uncovered pixels are not read or processed, allowing the texel filtering processing throughput to be used to produce filtered results for covered pixels.

Figure 4A:
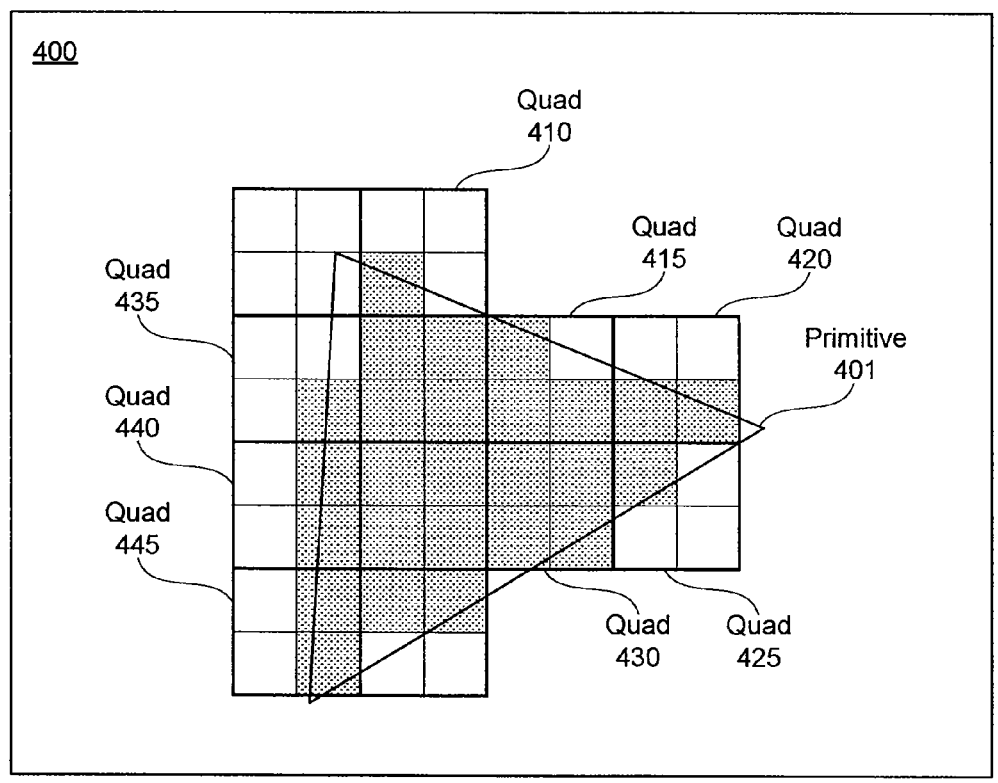
FIG. 4A is a conceptual diagram showing pixel coverage of a graphics primitive in accordance with one or more aspects of the present invention.

FIG. 4A is a conceptual diagram showing pixel coverage of a graphics primitive 401, in accordance with one or more aspects of the present invention. Primitive 401 covers at least one pixel in quads 410, 415, 420, 425, 430, 435, 440, and 445. Each quad includes a 2×2 pixel region of a render target 400. Quads 415 and 430 each include 3 or 4 covered pixels and the coverage optimization may not be used to reduce the filtering workload to produce filtered results for those quads. Quads 420, 440, and 445 each include only 2 covered pixels and the coverage optimization may be used to reduce the filtering workload by half for those quads.

Sampler 225 indicates whether the texels for the horizontally or vertically oriented pixels should be read from texel cache 280 since the pixel pairs may be oriented in either direction. Sampler 225 also indicates an alignment for the pixel pair. Specifically, a vertical orientation includes either the right or left aligned pixels and a horizontal orientation includes either the upper or lower aligned pixels. For example, quads 440 and 445 are vertically oriented and right aligned and quad 420 is horizontally oriented and lower aligned. Some embodiments of the present invention allow for diagonally oriented combinations of pixels when coverage optimization is used. When only a single pixel is covered, as is the case for quads 410, 425, and 435, sampler 225 may specify either a horizontal or a vertical orientation and the appropriate alignment.

Figure 4B:
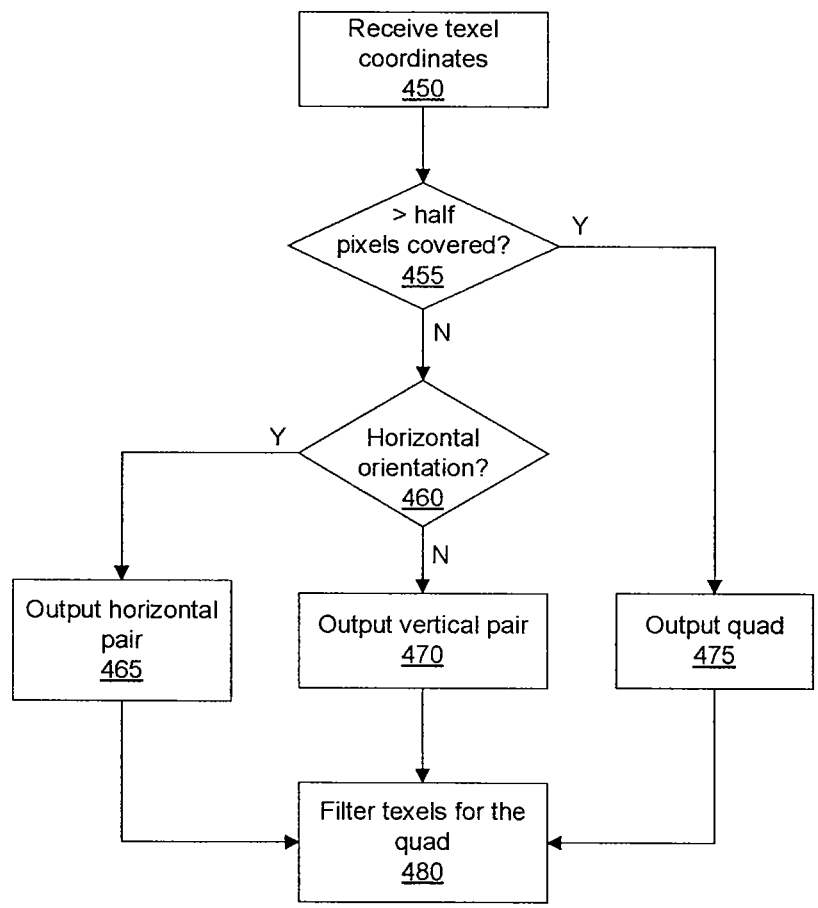
FIG. 4B illustrates an embodiment of a method of processing texels based on pixel coverage in accordance with one or more aspects of the present invention.

FIG. 4B illustrates an embodiment of a method of processing texels based on pixel coverage, in accordance with one or more aspects of the present invention. In step 450 sampler 225 receives a packet including texel coordinates for a pixel quad. In step 455 sampler 225 determines if more than half of the pixels are covered, and, if so, in step 475 sampler 225 outputs one or more packets including texel coordinates for the pixel quad. In some embodiments of the present invention, when covered pixels are diagonally oriented the coverage optimization cannot be performed and sampler 225 also proceeds to step 475.

If, in step 455 sampler 225 determines that not more than half of the pixels are covered, then in step 460 sampler 225 determines if the covered pixel pair is oriented horizontally. Sampler 225 effectively discards the pixel pair that does not include covered pixels. If, in step 460 sampler 225 determines that the covered pixels are oriented horizontally, then in step 465 sampler 225 outputs one or more packets including texel coordinates for the upper or lower horizontally oriented pixel pair. Sampler 225 also indicates whether the alignment of the pixel pair within the pixel quad is upper or lower. If, in step 460 sampler 225 determines that the covered pixels are not oriented horizontally, then in step 470 sampler 225 outputs one or more packets including texel coordinates for the left or right vertically oriented pixel pair. Sampler 225 also indicates whether the alignment of the pixel pair within the pixel quad is left or right.

In step 480 the one or more packets including texels read from texel cache 280 are filtered by texture filter unit 270 to produce filtered results for the pixel quad. A single packet may be output by sampler 225 to provide texel coordinates for 32 bit texels that are used to produce an filtered result for a pixel pair with an anisotropic ratio of 4:1 or less, compared with using two packets for the entire pixel quad. Similarly, a single packet may be output by sampler 225 to provide texel coordinates for 64 bit texels that are used to produce an filtered result for a pixel pair with an anisotropic ratio of 2:1 or less. A single packet may also be output by sampler 225 to provide texel coordinates for 128 bit texels that are used to produce an isotropically filtered result for a pixel pair. When larger anisotropic ratios are used, additional packets are output by sampler 225 and processed by texture filter unit 270 to accumulate the filtered results for the pixel pair. Therefore, coverage optimization may improve filtered texel throughput for high bit-count texels and for high anisotropic ratio filtering by eliminating texel reads and processing for uncovered pixels.

Figure 5B:
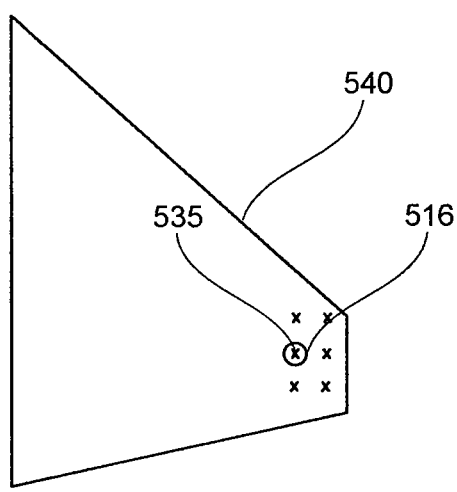

FIG. 5A is a conceptual diagram of texture map 142. A footprint 515 is a pixel footprint in texture space, with a position 535 being the pixel center. FIG. 5B illustrates texture map 142 applied to pixels of a surface 540 that is receding in image space. When viewed in image space, footprint 515 (an ellipse) appears as footprint 516 (a circle). Alternatively, footprint 515 may appear as a quadrilateral and footprint 516 may appear as a square. While isotropic filtering of texture samples within a pixel footprint that forms a circle in texture space results in a high-quality image, isotropic filtering of texture samples within a pixel footprint that forms an ellipse, such as footprint 515, results in an image with aliasing artifacts. In contrast to isotropic filtering, anisotropic filtering uses a rectangular shaped filter pattern, resulting in fewer aliasing artifacts for footprints with major and minor axes that are not similar in length in texture space.

Figure 5C:
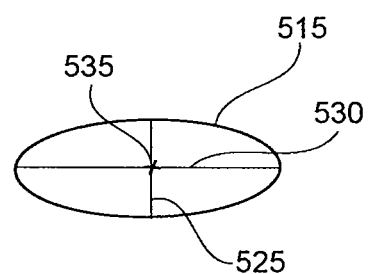

FIG. 5C illustrates footprint 515 including a minor axis 525 that is significantly shorter than a major axis 530. Minor axis 525 corresponds to the v texture coordinate axis and major axis 530 corresponds to the x texture coordinate axis. The x axis in pixel space is aligned with the u axis in texture space for texture map 142 applied to surface 540.

Figure 5D:
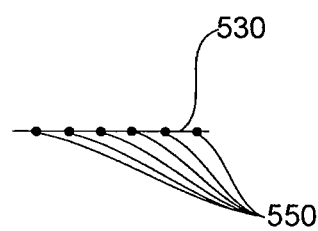
FIG. 5D illustrates anisotropic texture sampling along an axis for anisotropic filtering.

FIG. 5D illustrates an application of anisotropic filtering of texture samples 550 along major axis 530. Texture samples 550 are anisotropically filtered to produce a filtered result. Classic anisotropic filtering filters up to 16 samples in a non-square pattern, compared with 1 sample when isotropic filtering is used. The number of texels read and processed for each sample may be 1, 4, or 8 depending on whether the texture sample is computed by point sampling, bilinearly filtering, or trilinearly filtering, respectively. Therefore, anisotropic filtering requires reading more texels than isotropic filtering. Furthermore, when a texel cache is used to improve performance of a texture unit within a graphics processor, reading more texels requires accessing more cache lines. Texel cache read locality may be improved by organizing cache read requests in a sequence of packets when two or more pixels are processed in parallel, i.e., when texels are read for texture samples within two or more pixels, as described further herein. Improving texel cache read locality may improve texture mapping performance.

Figure 6A:
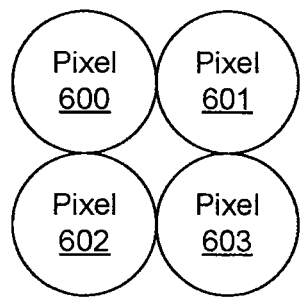
FIG. 6A illustrates an arrangement of four pixels in accordance with one or more aspects of the present invention.

FIG. 6A illustrates an arrangement of four pixels, a pixel 600, a pixel 601, a pixel 602, and a pixel 603, in accordance with one or more aspects of the present invention. Parameter derivative values such as du and dv relative to x and y, e.g., du/dx, dv/dx, du/dy, and dv/dy, may be computed for a pixel quad such as pixels 600, 601, 602, and 603. Pixels 600 and 601 and pixels 602 and 603 are aligned along the x axis in pixel space and pixels 600 and 602 and pixels 601 and 603 are vertically oriented, i.e., aligned along the y axis, in pixel space. The derivative values may be used by sampler 225 to determine the texel coordinates of anisotropic samples for each of pixel 600, 601, 602, and 603. The four pixels are generally processed in parallel, and thus the texels required for these four pixels are also read and processed in parallel.

Figure 6B:
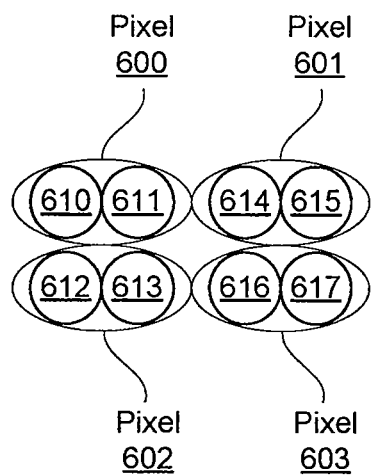
FIGS. 6B, 6C, and 6D illustrate embodiments of a method of pairing texels for processing in accordance with one or more aspects of the present invention.

FIG. 6B illustrates an embodiment of a method of ordering reads of texels for texture samples for use in an anisotropic texture map filtering computation in accordance with one or more aspects of the present invention. The anisotropic ratio is used to determine the number of texture samples that are filtered to produce each filtered result. In FIG. 6B, the level of anisotropy is 2:1, so texels for two texture samples are read for each of pixel 600, 601, 602, and 603. Texels for texture samples 610, 611, 612, 613, 614, 615, 616, and 617 may be read in the following order when the texel format is 64 bits: texels for texture samples 610, 612, 611, and 613 in one clock cycle and texels for texture samples 614, 616, 615, and 617 in another clock cycle. Instead of reading texels for one texture sample for each pixel, texels for two texture samples are read for two pixels during each clock cycle. Specifically, texels for groups of texture samples are read for a pair of pixels that are vertically oriented in pixel space when the major axis of anisotropy is aligned with the x axis in pixel space, such as pixels 600 and 602 or pixels 601 and 603.

A group of texture samples may include a single texture sample, two texture samples, such as texture samples 610 and 611, or more texture samples. When a pixel quad is split for high bit-count texels or for a high anisotropic ratio, the pixel quad should be split horizontally or vertically based on the alignment of the major axis of anisotropy to ensure texel cache locality. Ordering texel reads based on texture sample locality may result in an increase in shared cache line accesses, reducing the number of clock cycles needed to read the texels needed to produce each filtered pixel.

Figure 6C:
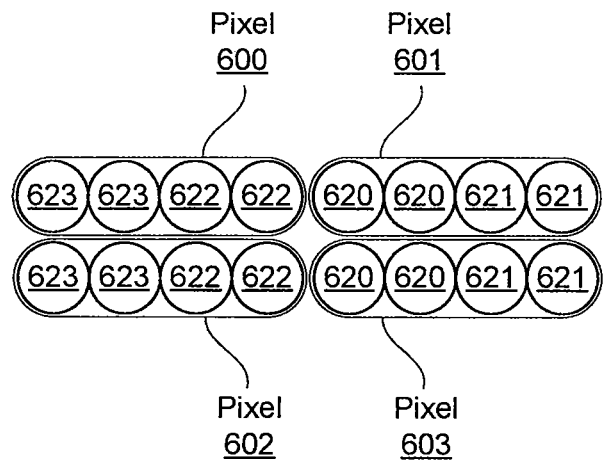

FIG. 6C illustrates another embodiment of a method of ordering reads of texels for texture samples for use in an anisotropic texture map filtering computation in accordance with one or more aspects of the present invention. In FIG. 6C, the level of anisotropy is 4:1, so texels for four texture samples are read for each pixel 600, 601, 602, and 603. In one embodiment of the present invention, texels for pairs of groups of texture samples 623, 622, 620, and 621 are read starting at one end of the major axis of anisotropy in texture space and ending at the opposing end of the major axis of anisotropy. Specifically, 64 bit texels for texture samples 623, 622, 620, and 621 are read in the following order: texels for texture samples 623 in a first clock cycle, texels for texture samples 622 in a second clock cycle, texels for texture samples 620 in a third clock cycle, and texels for texture samples 621 in a fourth clock cycle.

32 bit texels for texture samples 623, 622, 620, and 621 are read in the following order: texels for texture samples 623 and 622 in a first clock cycle and texels for texture samples 620 and 621 in a second clock cycle. 128 bit texels for texture samples 623, 622, 620, and 621 are read in the following order: two texel components for texture samples 623 in a first clock cycle, two texel components for texture samples 622 in a second clock cycle, two texel components for texture samples 620 in a third clock cycle, and two texel components for texture samples 621 in a fourth clock cycle. The 128 bit texel sequence is repeated to read the remaining components for the 128 bit texels. In alternate embodiments of the present invention, texels for a smaller or larger number of texture samples are read during a single clock cycle, dependent on the number of read ports on texel cache 280.

Figure 6D:
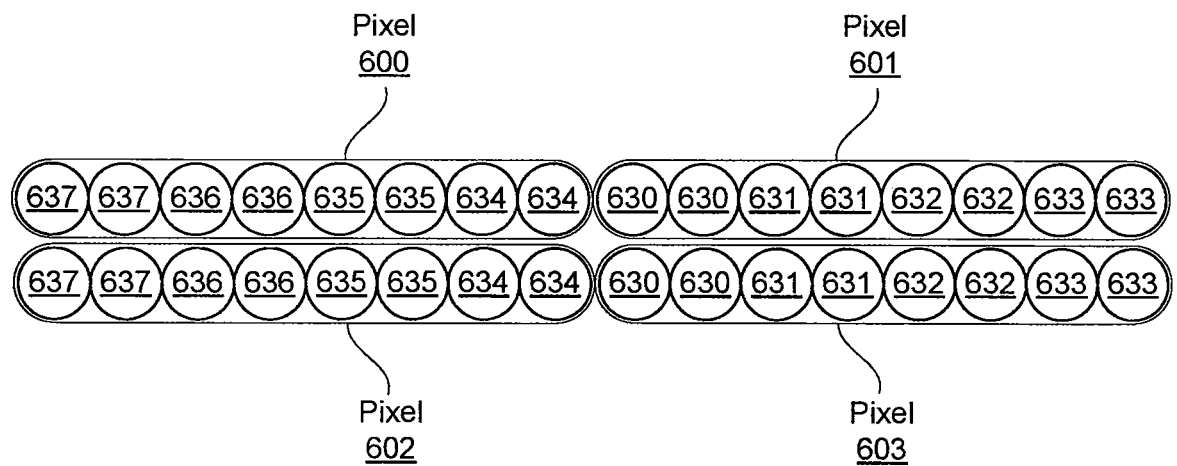

FIG. 6D illustrates yet another embodiment of a method of ordering reads of texels for texture samples for use in an anisotropic texture map filtering computation, in accordance with one or more aspects of the present invention. In FIG. 6D, the level of anisotropy is 8:1, so texels for eight texture samples are read for each pixel 600, 601, 602, and 603. In one embodiment of the present invention, texels for pairs of groups of texture samples 637, 636, 635, 634, 630, 631, 632, and 633 are read starting at one end of the major axis of anisotropy in texture space and ending at the opposing end of the major axis of anisotropy. Specifically, 64 bit texels for texture samples 637, 636, 635, 634, 630, 631, 632, and 633 are read in the following order: texels for texture samples 637 in a first clock cycle, texels for texture samples 636 in a second clock cycle, texels for texture samples 635 in a third clock cycle, texels for texture samples 634 in a fourth clock cycle, texels for texture samples 630 in a fifth clock cycle, texels for texture samples 631 in a sixth clock cycle, texels for texture samples 632 in a seventh clock cycle, and texels for texture samples 633 in an eighth clock cycle.

32 bit texels for texture samples 637, 636, 635, 634, 630, 631, 632, and 633 are read in the following order: texels for texture samples 637 and 636 in a first clock cycle, texels for texture samples 635 and 634 in a second clock cycle, texels for texture samples 630 and 631 in a third clock cycle, and texels for texture samples 632 and 633 in a fourth clock cycle. 128 bit texels for texture samples 637, 636, 635, 634, 630, 631, 632, and 633 are read in the following order: two texel components for texture samples 637 in a first clock cycle, two texel components for texture samples 6636 in a second clock cycle, two texel components for texture samples 635 in a third clock cycle, two texel components for texture samples 634 in a fourth clock cycle, two texel components for texture samples 630 in a fifth clock cycle, two texel components for texture samples 631 in a sixth clock cycle, two texel components for texture samples 632 in a seventh clock cycle, and two texel components for texture samples 633 in an eighth clock cycle. The 128 bit texel sequence is repeated to read the remaining components for the 128 bit texels. In alternate embodiments of the present invention, texels for a smaller or larger number of texture samples are read during a single clock cycle, dependent on the number of read ports on texel cache 280.

Figure 7B:
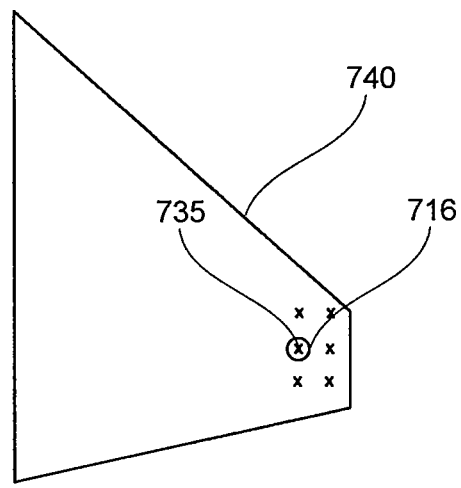

FIG. 7A is another conceptual diagram of texture map 142. A footprint 715 is a pixel footprint in texture space, with a position 735 being the pixel center. FIG. 7B illustrates texture map 142 applied to pixels of a surface 740 that is receding in image space. When viewed in image space, footprint 715 (an ellipse) appears as footprint 716 (a circle).

Figure 7C:
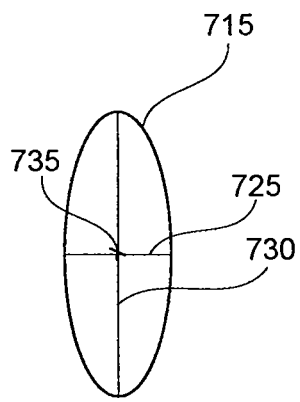

FIG. 7C illustrates footprint 715 including a minor axis 725 that is significantly shorter than a major axis 730. Minor axis 725 corresponds to the u texture coordinate axis and major axis 730 corresponds to the v texture coordinate axis. Texture map 142 is rotated 90 degrees counter-clockwise when applied to surface 740, therefore the x axis in pixel space is aligned with the v axis in texture space and the y axis in pixel space is aligned with the u axis in texture space. Likewise, major axis 730 corresponds to the x coordinate axis in pixel space and minor axis 725 corresponds to the y coordinate axis in pixel space.

Figure 7D:
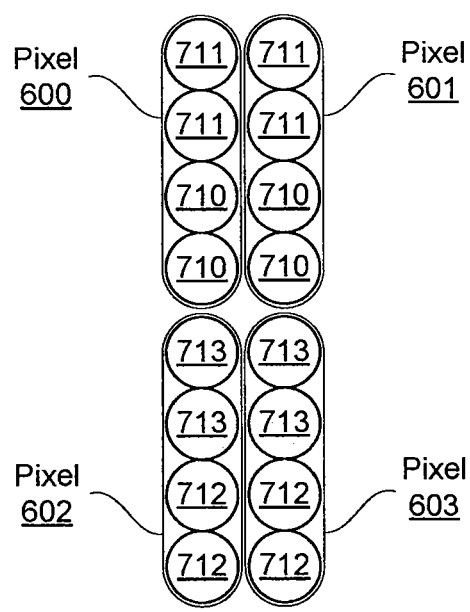
FIG. 7D illustrates another embodiment of a method of pairing texels for processing in accordance with one or more aspects of the present invention.

Using the embodiment of the present invention described in conjunction FIG. 6C, where the major axis of anisotropy in texture space is aligned with the x axis in pixel space, vertically oriented pixel would be read in parallel as a pair. However, FIG. 7D illustrates another embodiment of a method of pairing reads of texels for use in an anisotropic texture map filtering computation in accordance with one or more aspects of the present invention. Specifically, texels for groups of texture samples are read for a pair of pixels that are horizontally aligned in pixel space when the major axis of anisotropy is aligned with the y axis in pixel space, such as pixels 600 and 601 or pixels 602 and 603.

In FIG. 7D, the level of anisotropy is 4:1, so texels for four texture samples are read for each of pixel 600, 601, 602, and 603. Specifically, in one embodiment of the present invention, texels for pairs of groups of texture samples 710, 711, 712, and 713 are read in the following order: 64 bit texels for texture samples 710 in a first clock cycle, texels for texture samples 711 in a second clock cycle, texels for texture samples 712 in a third clock cycle, and texels for texture samples 713 in a fourth clock cycle.

32 bit texels for texture samples 710, 711, 712, and 713 are read in the following order: texels for texture samples 710 and 711 in a first clock cycle and texels for texture samples 712 and 713 in a second clock cycle. 128 bit texels for texture samples 710, 711, 712, and 713 are read in the following order: two texel components for texture samples 710 in a first clock cycle, two texel components for texture samples 711 in a second clock cycle, two texel components for texture samples 712 in a third clock cycle, and two texel components for texture samples 713 in a fourth clock cycle. The 128 bit texel sequence is repeated to read the remaining components for the 128 bit texels. In alternate embodiments of the present invention, texels for a smaller or larger number of texture samples are read during a single clock cycle, dependent on the number of read ports on texel cache 280. In alternate embodiments of the present invention, texels for a smaller or larger number of texture samples are read during a single clock cycle, dependent on the number of read ports on texel cache 280.

When a pixel quad is split into multiple packets for processing high bit-count texels or for a high anisotropic ratio, the alignment of the major axis of anisotropy in pixel space is used to split the pixel quad horizontally or vertically to ensure texel cache locality and improve the cache hit rate. Pairing texel reads based on texture sample locality may result in an increase in shared cache line accesses, reducing the number of clock cycles needed to read the texels needed to produce each filtered pixel. Allowing pixel quads to be split vertically or horizontally is also used to support the coverage optimization.

Figure 8A:
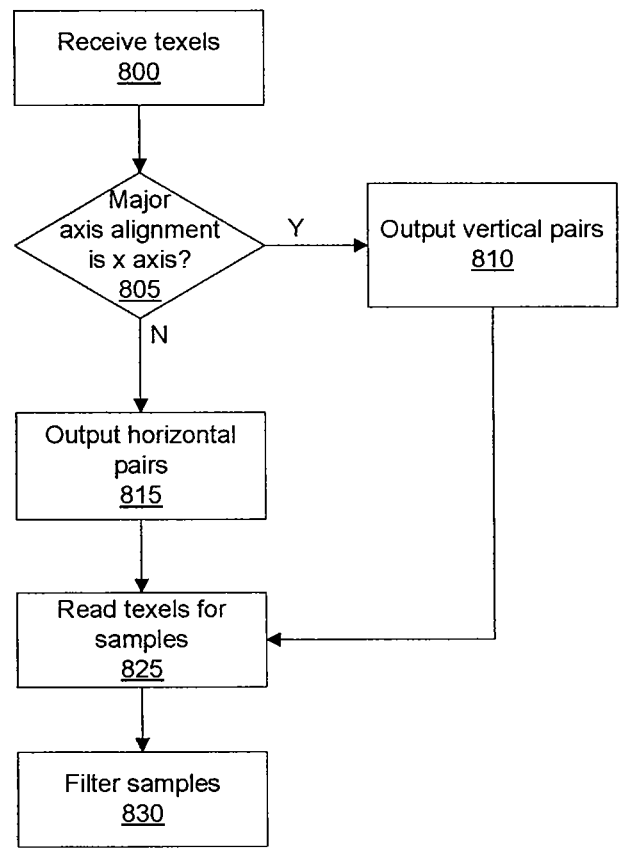
FIG. 8A illustrates an embodiment of a method of serializing texel processing based on a screen space alignment of the major axis of anisotropy in accordance with one or more aspects of the present invention.

FIG. 8A illustrates an embodiment of a method of serializing texel processing based on a screen space alignment of the axis of anisotropy to perform a pixel pairing optimization, in accordance with one or more aspects of the present invention. The method is used for pixel quads that are processed in multiple packets, such as high bit-count texels and high anisotropic ratio pixels. In step 800 sampler 225 receives a packet including texel coordinates for a pixel quad. In step 805 pixel pairing unit 235 determines if the major axis of anisotropy is more closely aligned with the x axis or with the y axis. If, in step 805 pixel pairing unit 235 determines the major axis alignment is the x axis, then in step 810 pixel pairing unit 235 pairs texel reads for texture samples within pixels that are vertically aligned, i.e., aligned with the y axis in pixel space.

If, in step 805 pixel pairing unit 235 determines the major axis alignment is not the x axis, i.e., the major axis alignment is the y axis, then in step 815 pixel pairing unit 235 pairs texel reads for texture samples within pixels that are horizontally aligned, i.e., aligned with the x axis in pixel space. In step 825 sampler 225 outputs the packets including paired texels to address computation unit 250 and the texels are provided by texel cache 280. In step 830 the one or more packets including texels read from texel cache 280 are filtered by texture filter unit 270 to produce filtered results for the pixel quad.

Figure 8B:
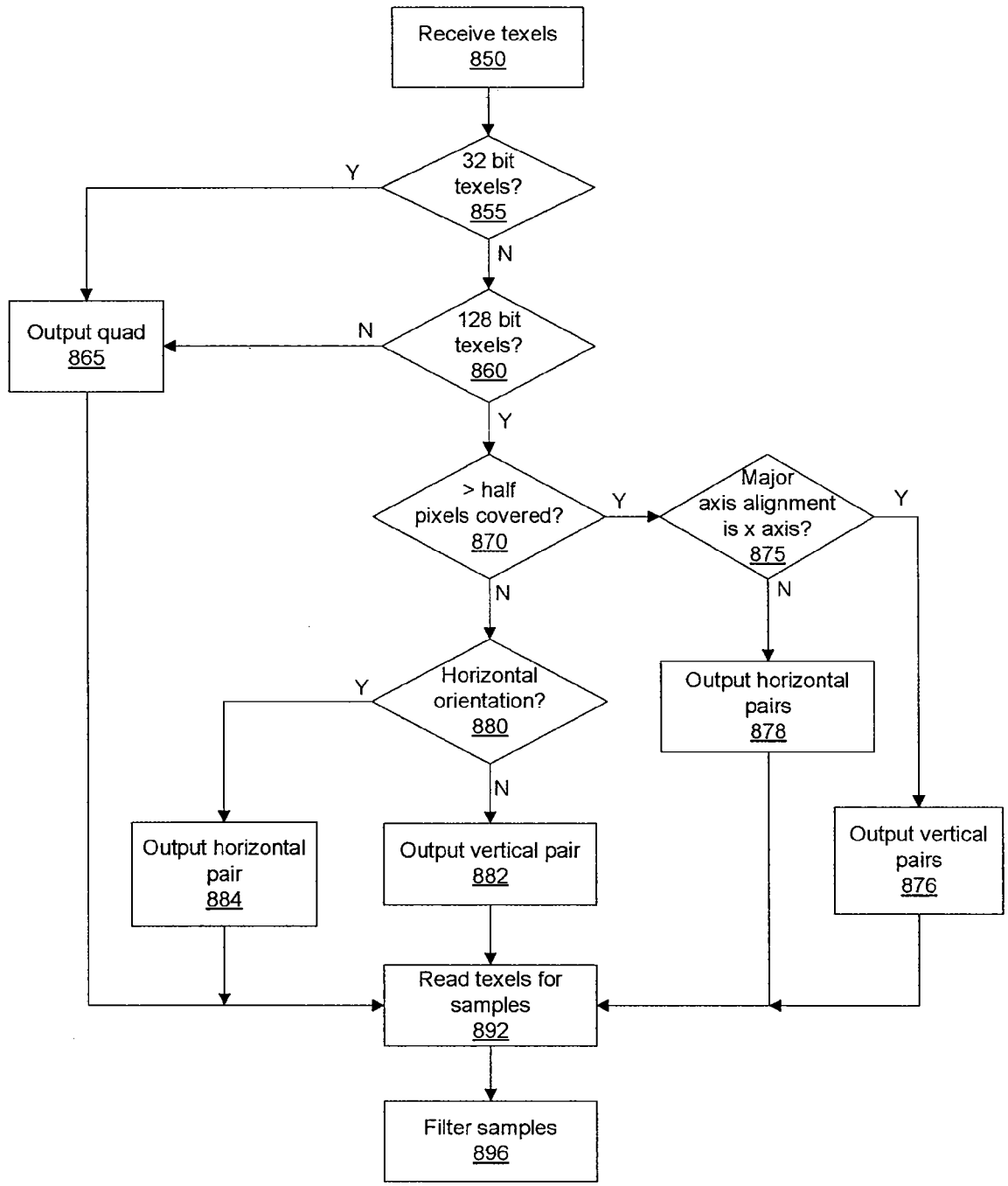
FIG. 8B illustrates another embodiment of a method of serializing texel processing based on a screen space alignment of the major axis of anisotropy and pixel coverage in accordance with one or more aspects of the present invention.

FIG. 8B illustrates another embodiment of a method of serializing texel processing using the pixel pairing optimization and the coverage optimization in accordance with one or more aspects of the present invention. The method is also used for pixel quads that are processed in multiple packets, such as high bit-count texels and high anisotropic ratio pixels. In step 850 sampler 225 receives a packet including texel coordinates for a pixel quad. In step 855 sampler 225 determines if the texel format is 32 bits per texel, and, if so, in step 865 sampler 225 outputs one or more packets including texel coordinates for the 32 bit texels. If, in step 855 sampler 225 determines if the texel format is not 32 bits per texel, then in step 860 sampler 255 determines if each output packet includes two of the four pixels in the pixel quad rather than including all four pixels. If, in step 860 sampler 255 determines that each packet includes four pixels, then in step 865 sampler 225 outputs one or more packets including texel coordinates for the 64 bit texels.

If, in step 860 sampler 255 determines that each packet includes two of the four pixels, then in step 870 sampler 225 determines if more than half of the pixels in the quad are covered, and, if so, in step 875 pixel pairing unit 235 determines if the major axis of anisotropy is aligned with the x axis. In some embodiments of the present invention, when covered pixels are diagonally oriented the coverage optimization cannot be performed and sampler 225 also proceeds from step 870 to step 875. If, in step 875 pixel pairing unit 235 determines that the major axis of anisotropy is aligned with the x axis, then in step 876 sampler 225 outputs one or more packets including texel coordinates for the upper and lower horizontally oriented pixel pairs. If, in step 875 pixel pairing unit 235 determines that the major axis of anisotropy is not aligned with the x axis, then in step 878 sampler 225 outputs one or more packets including texel coordinates for the upper and lower vertically oriented pixel pairs.

If, in step 870 sampler 225 determines that more than half of the pixels in the quad are not covered, then in step 880 sampler 225 determines if the covered pixels are horizontally oriented. If, in step 880 sampler 225 determines that the covered pixels are oriented horizontally, then in step 884 sampler 225 outputs one or more packets including texel coordinates for the upper or lower horizontally oriented pixel pair. Sampler 225 also indicates whether the alignment of the pixel pair within the pixel quad is upper or lower. If, in step 880 sampler 225 determines that the covered pixels are not oriented horizontally, then in step 882 sampler 225 outputs one or more packets including texel coordinates for the left or right vertically oriented pixel pair. Sampler 225 also indicates whether the alignment of the pixel pair within the pixel quad is left or right.

In step 892 sampler 225 outputs the one or more packets to address computation unit 250 and the texels are provided by texel cache 280. In step 896 the one or more packets including texels read from texel cache 280 are filtered by texture filter unit 270 to produce filtered results for the pixel quad. Pairing texel reads based on texture sample locality in steps 878 and 876 may result in an increase in shared cache line accesses, reducing the number of clock cycles needed to read the texels needed to produce each filtered pixel. Allowing pixel quads to be split vertically or horizontally and eliminating pixel pairs that are not covered also reduces the number of clock cycles needed to produce each filtered pixel and improves texel filtering throughput.

Persons skilled in the art will appreciate that any system configured to perform the method steps of FIG. 3A, 3B, 4B, 8A, or 8B, or their equivalents, are within the scope of the present invention. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

When a pixel quad is split into multiple packets for processing high bit-count texels or for a high anisotropic ratio, the alignment of the major axis of anisotropy in pixel space is used to perform a pixel pairing optimization and split the pixel quad horizontally or vertically to ensure texel cache locality and improve the cache hit rate. A pixel coverage optimization is used to eliminate texel reads and filtering operations for uncovered pixels, possibly improving texel filtering throughput. High bit-count texels may be processed by splitting pixel quads and processing texel components in separate passes to accumulate filtered results for the high bit-count texels. When some components are not needed, component optimization may be used to eliminate texel reads and filtering operations for those components, possibly improving texel filtering throughput.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of filtering 128 bit texels for pixels, comprising:
receiving texture coordinates for the 128 bit texels mapped to a pixel quad that includes four pixels, wherein each 128 bit texel represents four components;
processing, within a graphics processor, a first two of the four components of the 128 bit texels mapped to the four pixels to produce filtered 128 bit texels for the first two of the four components;
processing a second two of the four components of the 128 bit texels mapped to the four pixels to produce filtered 128 bit texels for the second two of the four components; and
combining the filtered 128 bit texels for the first two of the four components with the filtered 128 bit texels for the second two of the four components to produce the filtered result including the four components for the pixel quad.

2. The method of claim 1, wherein the processing of the first two of the four components includes bilinearly filtering four 32 bit texel components to compute each one of the first two of the four components.

3. A computer-implemented method of filtering high bit-count texels for pixels, comprising:
receiving texture coordinates for the high bit-count texels mapped to a pixel quad that includes four pixels, wherein each high bit-count texel is represented by more than 8 bits and includes four components;
splitting the pixel quad into a first pixel pair including two of the four pixels and a second pixel pair including another two of the four pixels;
processing, within a graphics processor, a first two of the four components of the high bit-count texels mapped to the four pixels to produce filtered high bit-count texels for the first two of the four components of the first pixel pair;
processing the first two of the four components of the high bit-count texels mapped to the four pixels to produce filtered high bit-count texels for the first two of the four components of the second pixel pair; and
combining the filtered high bit-count texels for the first two of the four components of the first pixel pair with the filtered high bit-count texels for the first two of the four components of the second pixel pair to produce a filtered result for the first two components of the pixel quad.

4. The method of claim 3, wherein the first pixel pair and the second pixel pair each include two pixels of the pixel quad that are aligned with an x axis in pixel space when a major axis of anisotropy for the pixel quad in texture space is aligned with a y axis in pixel space.

5. The method of claim 3, wherein the first pixel pair and the second pixel pair each include two pixels of the pixel quad that are aligned with a y axis in pixel space when a major axis of anisotropy for the pixel quad in texture space is aligned with an x axis in pixel space.

6. The method of claim 3, further comprising outputting the filtered result including the first two of the four components for the pixel quad when a second two of the four components are not specified as outputs by a shader program.

7. The method of claim 3, further comprising:
processing a second two of the four components of the high bit-count texels mapped to the four pixels to produce filtered high bit-count texels for the second two of the four components of the first pixel pair;
processing the second two of the four components of the high bit-count texels mapped to the four pixels to produce filtered high bit-count texels for the second two of the four components of the second pixel pair; and
combining the filtered high bit-count texels for the second two of the four components of the first pixel pair, the filtered high bit-count texels for the second two of the four components of the second pixel pair, and the filtered result including the first two components of the pixel quad to produce a filtered result for the four components of the pixel quad.

8. The method of claim 3, wherein the high bit-count texels are 128 bits and each one of the four components is 32 bits.

9. The method of claim 3, wherein the processing of the first two of the four components of the high bit-count mapped to the four pixels to produce filtered high bit-count texels for the first two of the four components of the first pixel pair includes anisotropically filtering at least eight 32 bit texel components to compute each one of the first two of the four components.

10. A texture unit for filtering high bit-count texels for pixels, the texture unit being integrated with a programmable graphics processor, the texture unit comprising:
a sampler integrated with the programmable graphics processor and configured to receive texture map coordinates for the high bit-count texels mapped to a pixel quad that includes four pixels and split the pixel quad into a first pixel pair and a second pixel pair for processing, wherein each high bit-count texel is represented by more than 8 bits and includes four components; and
a texture filter unit integrated with the programmable graphics processor and configured to filter a first two of the four texel components of the high bit-count texels for the first pixel pair and for the second pixel pair to produce a first two filtered texel components for the pixel quad and output the first two filtered texel components when a second two of the four texel components are not used.

11. The texture unit of claim 10, wherein the texture filter unit is further configured to filter the second two of the four texel components of the high bit-count texels for the first pixel pair and for the second pixel pair to produce a second two filtered texel components for the pixel quad and output the first two filtered texel components and the second two filtered texel components when the first two and the second two of the four texel components are used.

12. The texture unit of claim 10, wherein the sampler is configured to split the pixel quad so that the first pixel pair and the second pixel pair each include two pixels of the pixel quad that are aligned with an x axis in pixel space when a major axis of anisotropy for the pixel quad in texture space is aligned with a y axis in pixel space.

13. The texture unit of claim 10, wherein the sampler is configured to split the pixel quad so that the first pixel pair and the second pixel pair each include two pixels of the pixel quad that are aligned with a y axis in pixel space when a major axis of anisotropy for the pixel quad in texture space is aligned with an x axis in pixel space.

14. The texture unit of claim 10, further comprising a texel cache coupled to the texture filter unit and configured to store at least a portion of the high bit-count texels.

15. The texture unit of claim 10, wherein the high bit-count texels are 128 bits and each one of the four components is 32 bits.

16. The texture unit of claim 10, wherein the sampler is configured to compute texture map coordinates corresponding to bilinear texture samples that approximate footprints in texture space produced by projecting each one of the pixels in the pixel quad into the texture space and output the computed texture map coordinates for the first pixel pair and the second pixel pair.

17. The texture unit of claim 16, further comprising an address computation unit configured to convert the computed texture map coordinates into memory addresses used to read the high bit-count texels for output to the texture filter unit.

18. The texture unit of claim 10, wherein the programmable graphics processor includes a rasterizer that is configured to process primitives and generate fragment data including the texture map coordinates for output to the texture unit.

* * * * *